United States Patent
Agostinelli

[11] Patent Number: 6,138,831
[45] Date of Patent: Oct. 31, 2000

[54] MULTI-PURPOSE ORGANIZING CONTAINER SYSTEM

[76] Inventor: Donna L. Agostinelli, 35 Belden La., Rocky Hill, Conn. 06067

[21] Appl. No.: 09/321,159

[22] Filed: May 27, 1999

[51] Int. Cl.[7] .................................................. A45C 11/20
[52] U.S. Cl. ...................... 206/541; 206/217; 220/345.5; 220/507
[58] Field of Search ............................ 224/275; 220/507, 220/345.5; 206/541, 217

[56] References Cited

U.S. PATENT DOCUMENTS

| | | | |
|---|---|---|---|
| 3,338,629 | 8/1967 | Drees | 312/235.8 |
| 3,938,688 | 2/1976 | Ryan | 206/541 |
| 4,106,829 | 8/1978 | Dolle et al. | 312/235.8 |
| 4,300,709 | 11/1981 | Page, Jr. | 224/275 |
| 4,512,503 | 4/1985 | Gioso | 224/539 |
| 4,754,883 | 7/1988 | Grzywa | 224/400 |
| 4,832,241 | 5/1989 | Radcliffe | 224/275 |
| 4,928,865 | 5/1990 | Lorence et al. | 224/275 |
| 5,505,307 | 4/1996 | Shink | 206/541 |
| 5,542,589 | 8/1996 | McKee | 224/275 |
| 5,551,616 | 9/1996 | Stitt et al. | 224/275 |

*Primary Examiner*—Paul T. Sewell
*Assistant Examiner*—Troy Arnold

[57] ABSTRACT

A multi-purpose organizing container system for storing various items for facilitating entertainment and refreshment during travel. The multi-purpose organizing container system includes an outer housing, a plurality of compartments for holding various items, a pair of oppositional tracks, and a pair of lid members for sliding into the tracks to cover the housing. Preferably, the lid members are planar boards each having a clip attached thereto. In a preferred embodiment, the plurality of containers includes insulated beverage holders, utensil compartments for holding removable utensil cups, a central storage compartment, book slots, and a trash bin compartment for holding a removable trash bin. It is further preferred that all exterior corners of the housing and exterior edges of the tracks are substantially rounded to enhance safe use of the container system.

1 Claim, 3 Drawing Sheets

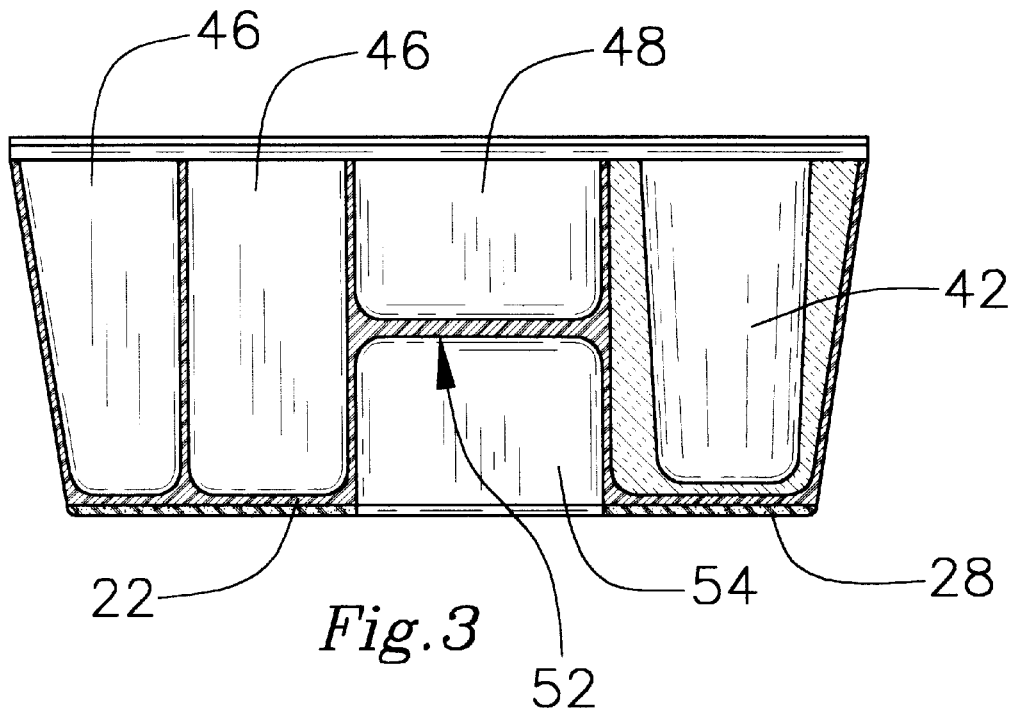
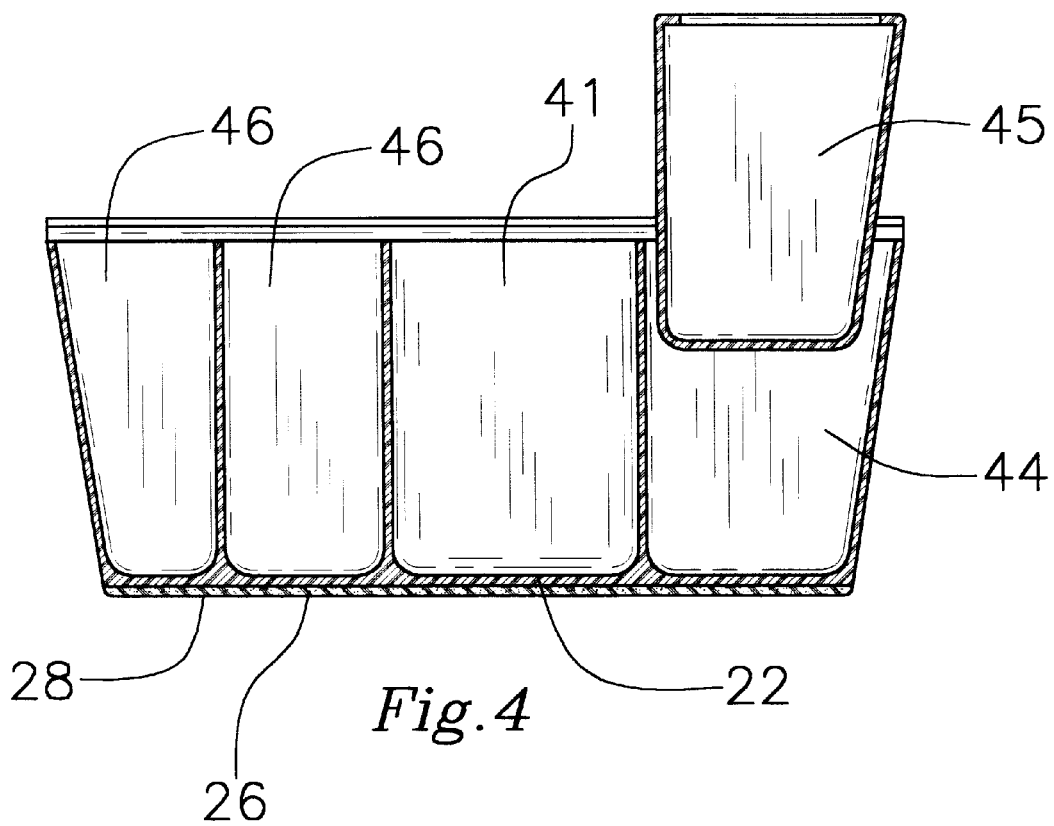

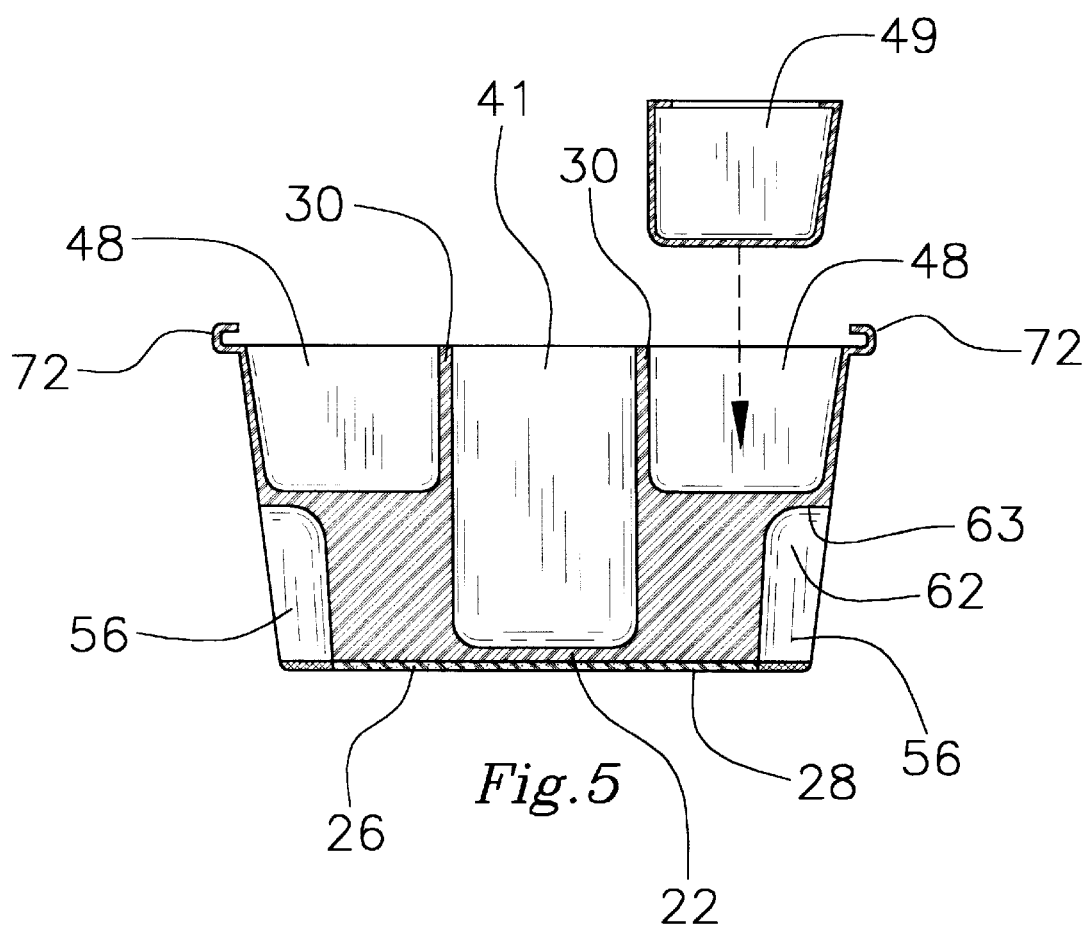

MULTI-PURPOSE ORGANIZING CONTAINER SYSTEM

BACKGROUND OF THE INVENTION

1. Field of the Invention

The present invention relates to travel organizers and more particularly pertains to a new multi-purpose organizing container system for storing various items for facilitating entertainment and refreshment during travel.

2. Description of the Prior Art

The use of travel organizers is known in the prior art. More specifically, travel organizers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,338,629; U.S. Pat. No. 3,800,939; U.S. Pat. No. Des. 356,891; U.S. Pat No. 4,512,503; U.S. Pat. No. 4,300,709; and U.S. Pat. No. 5,007,569.

While these devices fulfill their respective, particular objectives and requirements, the aforementioned patents do not disclose a new multi-purpose organizing container system. The inventive device includes an outer housing, a plurality of compartments for holding various items, a pair of oppositional tracks, and a pair of lid members for sliding into the tracks to cover the housing.

In these respects, the multi-purpose organizing container system according to the present invention substantially departs from the conventional concepts and designs of the prior art, and in so doing provides an apparatus primarily developed for the purpose of storing various items for facilitating entertainment and refreshment during travel.

SUMMARY OF THE INVENTION

In view of the foregoing disadvantages inherent in the known types of travel organizers now present in the prior art, the present invention provides a new multi-purpose organizing container system construction wherein the same can be utilized for storing various items for facilitating entertainment and refreshment during travel.

The general purpose of the present invention, which will be described subsequently in greater detail, is to provide a new multi-purpose organizing container system apparatus and method which has many of the advantages of the travel organizers mentioned heretofore and many novel features that result in a new multi-purpose organizing container system which is not anticipated, rendered obvious, suggested, or even implied by any of the prior art travel organizers, either alone or in any combination thereof.

To attain this, the present invention generally comprises an outer housing, a plurality of compartments for holding various items, a pair of oppositional tracks, and a pair of lid members for sliding into the tracks to cover the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-purpose organizing container system apparatus and method which has many of the advantages of the travel organizers mentioned heretofore and many novel features that result in a new multi-purpose organizing container system which is not anticipated, rendered obvious, suggested, or even implied by any of the prior art travel organizers, either alone or in any combination thereof.

It is another object of the present invention to provide a new multi-purpose organizing container system that may be easily and efficiently manufactured and marketed.

It is a further object of the present invention to provide a new multi-purpose organizing container system that is of a durable and reliable construction.

An even further object of the present invention is to provide a new multi-purpose organizing container system which is susceptible of a low cost of manufacture with regard to both materials and labor, and which accordingly is then susceptible of low prices of sale to the consuming public, thereby making such multi-purpose organizing container system economically available to the buying public.

Still yet another object of the present invention is to provide a new multi-purpose organizing container system which provides in the apparatuses and methods of the prior art some of the advantages thereof, while simultaneously overcoming some of the disadvantages normally associated therewith.

Still another object of the present invention is to provide a new multi-purpose organizing container system for storing various items for facilitating entertainment and refreshment during travel.

Yet another object of the present invention is to provide a new multi-purpose organizing container system which includes an outer housing, a plurality of compartments for holding various items, a pair of oppositional tracks, and a pair of lid members for sliding into the tracks to cover the housing.

Still yet another object of the present invention is to provide a new multi-purpose organizing container system that provides a combination of static and removable compartments for the organized placement of various items associated with travel.

Even still another object of the present invention is to provide a new multi-purpose organizing container system that facilitates both the storage and playing of games during travel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention taken along line 3—3 of FIG. 2.

FIG. 4 is a cross-sectional view of the present invention taken along line 4—4 of FIG. 2.

FIG. 5 is a cross-sectional view of the present invention taken along line 5—5 of FIG. 2.

DESCRIPTION OF THE PREFERRED EMBODIMENT

Figure 1:
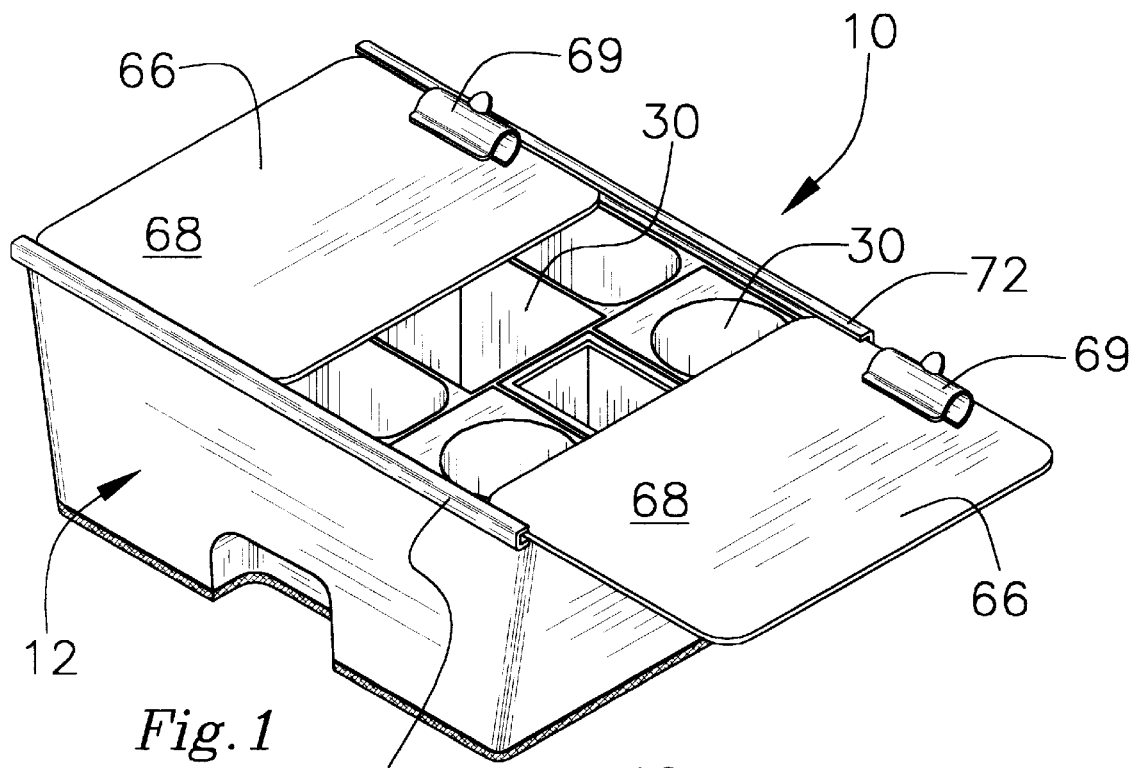
FIG. 1 is a perspective view of a new multi-purpose organizing container system according to the present invention.
Figure 2:
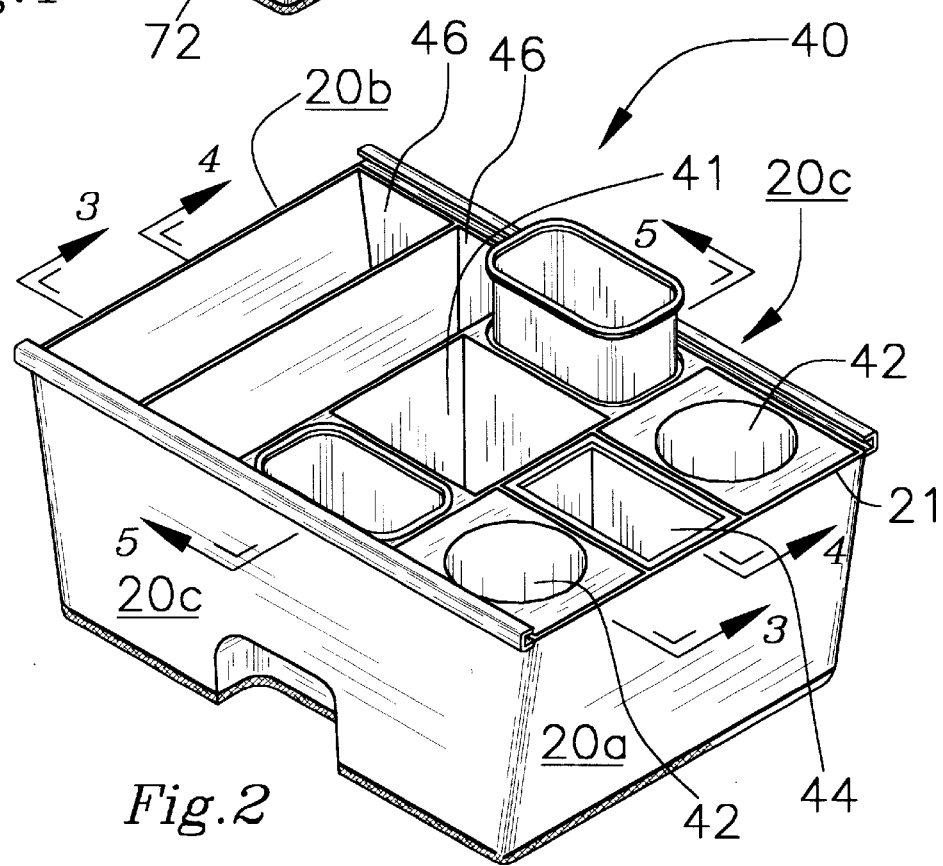
FIG. 2 is a perspective view of the housing of the present invention.

With reference now to the drawings, and in particular to FIGS. 1 through 5 thereof, a new multi-purpose organizing container system embodying the principles and concepts of the present invention and generally designated by the reference numeral 10 will be described.

As best illustrated in FIGS. 1 through 5, the multi-purpose organizing container system 10 generally comprises a housing 12 having outer side walls 20 and a bottom wall 22 defining an interior space 29 of the housing 12. The side walls 20 and the bottom wall 22 each include substantially rounded corners such that the housing 12 is designed for facilitating safe handling of the housing 12 by a user.

The bottom wall 22 of the housing 12 includes an exterior face 26. A gripping surface 28 is coupled to the exterior face 26 and is designed for preventing movement of the housing 12 relative to a surface abutting the gripping surface 28.

The housing 12 includes a plurality of interior walls 30 arranged to define a plurality of compartments 40 within the interior space 29. The plurality of compartments 40 includes a pair of insulated beverage holders 42 occupying adjacent corners 31 and 32 of the interior space 29. The plurality of compartments 40 also includes a trash bin compartment 44 for holding a removable trash bin 45. The trash bin compartment 44 is preferably positioned between the pair of beverage holders 42 and adjacent a first one of the side walls 20A.

The plurality of compartments 40 also includes a pair of elongated slots 46 each adapted for receiving a book therein. The pair of elongated slots 46 are positioned substantially parallel to each other and perpendicular with respect to a longitudinal axis of the housing 12. The pair of elongated slots 46 are also positioned adjacent to each other with one of the pair of elongated slots 46 adjacent a second one of the side walls 20B. The second side wall 20B is positioned opposite the first one of the pair of side walls 20A so that the weight of the books will act to counterbalance the weight of the beverages and trash collected for a more even distribution of weight about a latitudinal axis of the housing 12.

The plurality of compartments 40 further includes a pair of utensil compartments 48 for holding a respective removable utensil cup 49 adapted for holding pens and pencils. Each the utensil compartments 48 is further sized to have an opening and a depth suitable for holding snack items such as french fry containers or single serving potato chip bags when the utensil cup 49 is removed from the utensil compartment 48.

The plurality of compartments 40 also includes a central compartment 41 adapted for holding various items such as toys and games. The central compartment 41 is positioned between the two utensil compartments 48 and between one of the elongated slots 46 and the trash bin compartment 44.

The housing further includes a pair of oppositional handles 52. Each of the handles 52 is integrally formed into a respective one of an opposing pair of the side walls 20C. The handles 52 are formed by a depression 54 in each of the pair of side walls 20C. The depression 54 extends from the bottom wall 22 upwardly towards an upper perimeter edge 21 of the housing 12. The depression 54 forms a pair of depression side walls 56 and an upper face 62 substantially perpendicular to a face of the side wall 20C. The upper face 62 forms a gripping portion 63 of the handle 52. Preferably, each of the handles 52 is positioned adjacently below a respective one of the utensil compartments 48. Each of the utensil compartments 48 is shallower than the other compartments 40 for permitting positioning of the handles 52. While the handles 52 may extend fully below the utensil compartments 48 it is preferable that the handles extend only partially into the area below the utensil compartments 48 to minimize the open space below the handles to help prevent dropping items into this space. It is also preferred that the interior walls 30 be formed to provide a uniform depth for the utensil compartments to prevent an irregularly shaped open area into which food or other items may be dropped resulting in hard to clean areas of the interior space.

A pair of tracks 72 extends along opposite sides of the housing 12. The tracks 72 are positioned along the upper perimeter edge 21 of the housing 12 and include substantially rounded outer edges such that the tracks 72 are adapted for facilitating safe handling of the housing 12 by the user.

A pair of lid members 66 are designed for sliding between the tracks 72 such that the lid members cover the interior space 29. It is most preferred that the lid members 66 be conventional clip boards having substantially planar board member 68 and a clip member 69 coupled to a face of the board member 68.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An organizing container system comprising:

a housing having outer side walls and a bottom wall, said side walls and said bottom wall defining an interior space of said housing, said side walls and said bottom wall each having substantially rounded corners such that said housing is adapted for facilitating safe handling of the housing by a user;

said bottom wall of said housing having an exterior face, a gripping surface being coupled to said exterior face whereby an entirety of said exterior face is covered by said gripping surface for preventing movement of said housing relative to a surface abutting said gripping surface;

said housing having a plurality of interior walls arranged to define a plurality of compartments within said interior space;

said plurality of compartments including a pair of insulated beverage holders, said beverage holders occupying adjacent corners of said interior space;

said plurality of compartments including a trash bin compartment holding a removable trash bin, said trash bin compartment being positioned between said pair of beverage holders and adjacent a first one of said side walls;

wherein said plurality of compartments includes a pair of elongated slots each being for receiving a book therein, said pair of elongated slots being positioned substantially parallel to each other and perpendicular with respect to a longitudinal axis of said housing, said pair of elongated slots being adjacent to each other, one of said pair of elongated slots being adjacent a second one of said side walls, said second side wall being positioned opposite said first one of said pair of side walls;

wherein said plurality of compartments includes a pair of utensil compartments, each utensil compartment having a substantially uniform depth, said utensil compartments being for holding a respective removable utensil cup for holding pens and pencils, each said utensil compartment being for holding snack items when said utensil cup is removed from said utensil compartment;

wherein said plurality of compartments includes a central compartment adapted for holding items, said central compartment being positioned between said utensil compartments and further being positioned between one of said elongated slots and said trash bin compartment;

a pair of oppositional handles, one of said handles integrally formed into a respective one of an opposing pair of said side walls, said handles being formed by a depression in each of said pair of side walls, said depression extending from said bottom wall upwardly towards said upper perimeter edge to form a pair of depression side walls and an upper face, said upper face forming a gripping portion of said handle, each of said handles being positioned below a respective one of said utensil compartments;

a pair of tracks extending along opposite sides of said housing, said tracks being positioned along an upper perimeter edge of said housing, said pair of tracks having substantially rounded outer edges such that said tracks are adapted for facilitating safe handling of the housing by the user;

a pair of lid members, said lid members being for selectively sliding between said tracks from opposite sides of said tracks whereby said lid members selectively cover said interior space such that a medial portion of said interior space is accessible while each lid member covers an associated side of said interior space, each lid member being a substantially planar board member having a clip member coupled to a face of said board member whereby said lid member is adapted for clipping a sheet of paper on said face of said board member to facilitate use of the sheet of paper during travel and whereby said lid member is selectively engageable to said housing for providing a substantially static writing surface while covering said interior space of said housing, said lid member further being selectively removable from said tracks for use as a portable writing surface independent of said housing; and said utensil compartments being positioned in said medial portion of said interior space such that said utensil compartments are selectively accessible by sliding said lid members outwardly to expose said utensil compartments while said lid members cover said trash bin and said elongated slots.

\* \* \* \* \*